United States Patent
Cocchi et al.

(10) Patent No.: US 8,479,532 B2
(45) Date of Patent: Jul. 9, 2013

(54) MACHINE AND METHOD FOR THE TREATMENT OF LIQUID OR SEMI-LIQUID FOOD MIXTURES

(75) Inventors: Gino Cocchi, Bologna (IT); Gianni Zaniboni, Borgonuovo di Sasso Marconi (IT); Roberto Lazzarini, Reggio Emilia (IT)

(73) Assignee: Carpigiani Group-Ali S.p.A. (IT)

( * ) Notice: Subject to any disclaimer, the term of this patent is extended or adjusted under 35 U.S.C. 154(b) by 1208 days.

(21) Appl. No.: 12/320,098

(22) Filed: Jan. 16, 2009

(65) Prior Publication Data
US 2009/0191318 A1    Jul. 30, 2009

(30) Foreign Application Priority Data
Jan. 25, 2008    (IT) .............................. BO2008A0052

(51) Int. Cl.
*A23G 9/00*    (2006.01)

(52) U.S. Cl.
USPC .......................................................... 62/342

(58) Field of Classification Search
USPC .............................. 62/1, 115, 176.3, 342, 498
See application file for complete search history.

(56) References Cited

U.S. PATENT DOCUMENTS

| 4,548,054 A * | 10/1985 | Levine ............................ 62/342 |
| 4,637,221 A * | 1/1987 | Levine ............................ 62/342 |
| 5,199,278 A * | 4/1993 | Cocchi ............................ 62/343 |
| 2005/0229622 A1 | 10/2005 | Franck et al. |
| 2008/0149655 A1 | 6/2008 | Gist et al. |

FOREIGN PATENT DOCUMENTS

| DE | 4434177 | 3/1996 |
| KR | 20080003138 | 1/2008 |

OTHER PUBLICATIONS

Search Report dated Sep. 25, 2012 for counterpart European patent application.

\* cited by examiner

*Primary Examiner* — Melvin Jones
(74) *Attorney, Agent, or Firm* — Timothy J. Klima; Shuttleworth & Ingersoll, PLC

(57) ABSTRACT

A machine for the treatment of liquid and semi-liquid food mixtures comprises a mixture whipping and freezing/heating tank (3), a circuit (6) for cooling and/or heating basic products of which the mixture consists, comprising a compressor (7) driven by an electric motor (18), and a mixer (4) rotating inside the tank (3) to mix the basic products. The machine also comprises a control unit (11) for the speed of rotation of the compressor (7) electric motor (18), for regulating the compressor operating speed and varying the thermal power supplied by the compressor (7) according to at least the quantity of mixture treated.

20 Claims, 5 Drawing Sheets

MACHINE AND METHOD FOR THE TREATMENT OF LIQUID OR SEMI-LIQUID FOOD MIXTURES

BACKGROUND OF THE INVENTION

The present invention relates to a machine and a method for the treatment of liquid and semi-liquid food mixtures.

The present invention relates in particular, although without limiting the scope of the inventive concept, to machines for producing and treating crushed-ice drinks, sorbets, ice creams, soft ice creams, cream, yoghurt and the like and to pasteurizing machines and to machines for cooking, processing and preserving mixtures, creams, sauces, soups and mixtures in general and the like.

Machines of the type described above comprise a container or tank for the food product or mixture to be treated, more commonly known as a whipping and freezing/heating unit, means for heating and/or cooling it, and if necessary means for dispensing it, for example consisting of nozzles or taps designed to allow the end product (whipped cream, ice cream, crushed-ice drink, etc.) to be drawn out.

A feed circuit conveys the basic products of which the mixture consists, comprising for example liquid cream, mixtures of products for ice cream, syrups and the like, into the product treatment and processing tank.

To homogeneously mix together the basic products introduced into the whipping and freezing/heating unit, and to render even, during the heating or the cooling, the temperature of the entire mass of product being processed, there are also rotary mixing blades inside the whipping and freezing/heating unit.

A first motor, usually electric, controls the rotation of the mixing blades and a second motor, also preferably electric, drives a compressor which is part of the heating and/or cooling means.

The basic products usually have different temperatures and consistencies: during their processing, the temperature of the container and the continuous mixing action cause a change in the physical state, and therefore the consistency of the product, which gradually becomes more homogeneous, softer and denser.

During product processing, the temperature of the tank or whipping and freezing/heating unit must vary, increasing, for the preparation of creams, or reducing, for the preparation of ice creams. In both cases the motor which drives the compressor must vary its speed of rotation to regulate the compressor displaced volume and therefore the system refrigerating capacity. The mixing speed must also be regulated in time depending on the temperature reached by the entire mixture and the consistency of the food product. For some preparations, an inadequate mixing speed may irreversibly compromise the success of the end product. The temperature reached by the mixture in a predetermined time interval and the level of softness also depend on the quantity of mixture treated.

Conventional machines are sized to operate in optimum conditions only at a predetermined load of product to be treated. In other words, such machines operate in optimum temperature, mixing speed and energy consumption conditions only with a predetermined quantity of product, usually close to the tank maximum load.

Therefore, to avoid wasting energy, the machines must always operate in optimum conditions, that is to say, they must operate by treating a quantity of product close to the maximum value for which they were sized.

Disadvantageously, sometimes that may involve wasting basic products.

SUMMARY OF THE INVENTION

The present invention therefore has for an aim to produce a machine and a method for the treatment of liquid and semi-liquid food mixtures able to overcome the above-mentioned disadvantage.

In particular, the present invention has for an aim to produce a machine and a method for the treatment of liquid and semi-liquid food mixtures able to prepare a quantity of mixture which can be varied as required between a minimum and a maximum, always operating in optimum conditions.

Accordingly, the present invention achieves this aim with a machine and a method for the treatment of liquid and semi-liquid food mixtures with the characteristics described in one or more of the claims herein.

BRIEF DESCRIPTION OF THE DRAWINGS

The technical features of the invention, with reference to the above aims, are clearly described in the claims below and its advantages are more apparent in the detailed description which follows, with reference to the accompanying drawings which illustrate a preferred embodiment of the invention provided merely by way of example without restricting the scope of the inventive concept, and in which:

DESCRIPTION OF THE PREFERRED EMBODIMENTS

Figure 1:
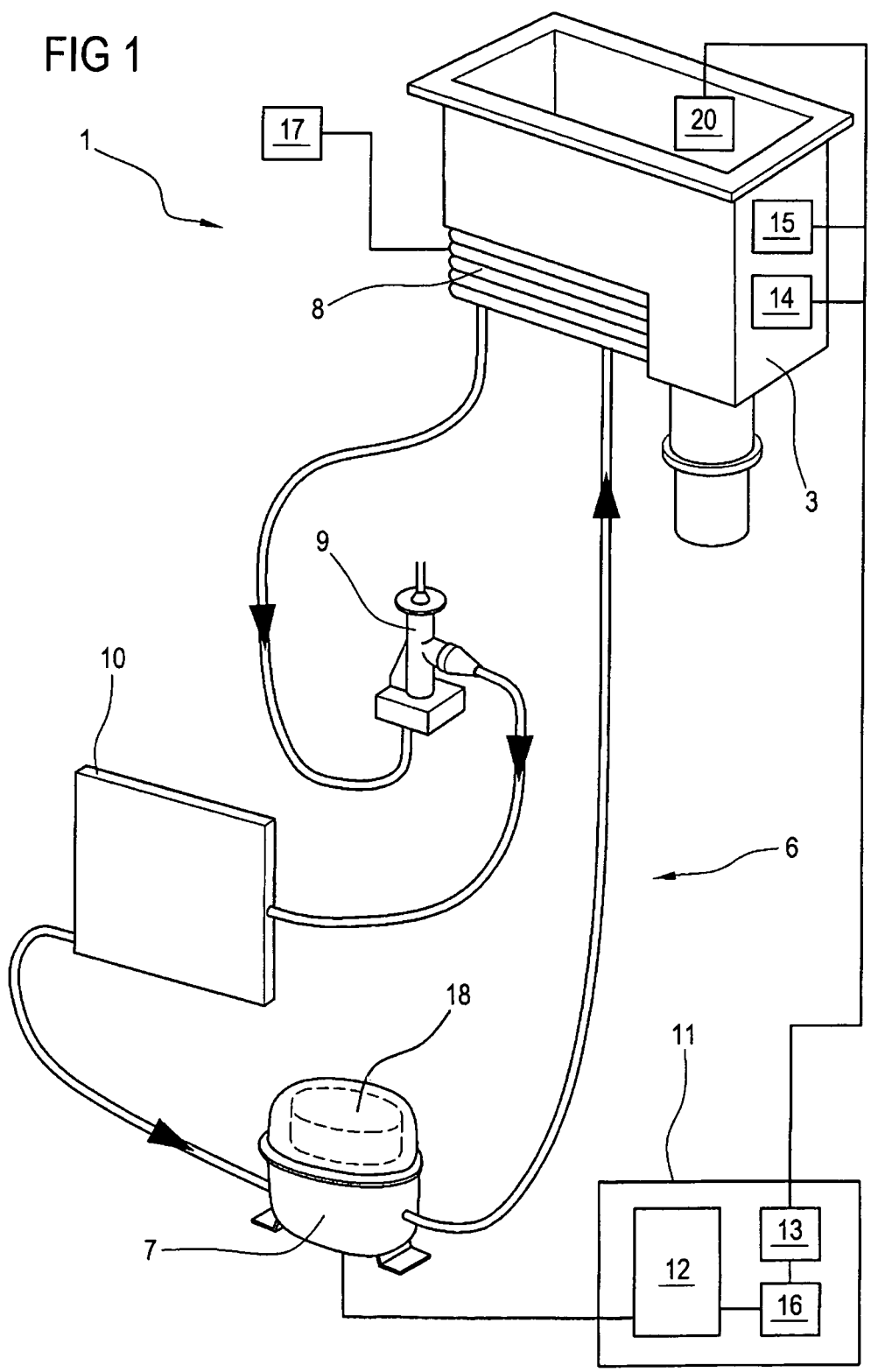
FIGS. 1 and 2 are schematic illustrations of the inner structure of a machine made in accordance with the present invention.
Figure 3A:
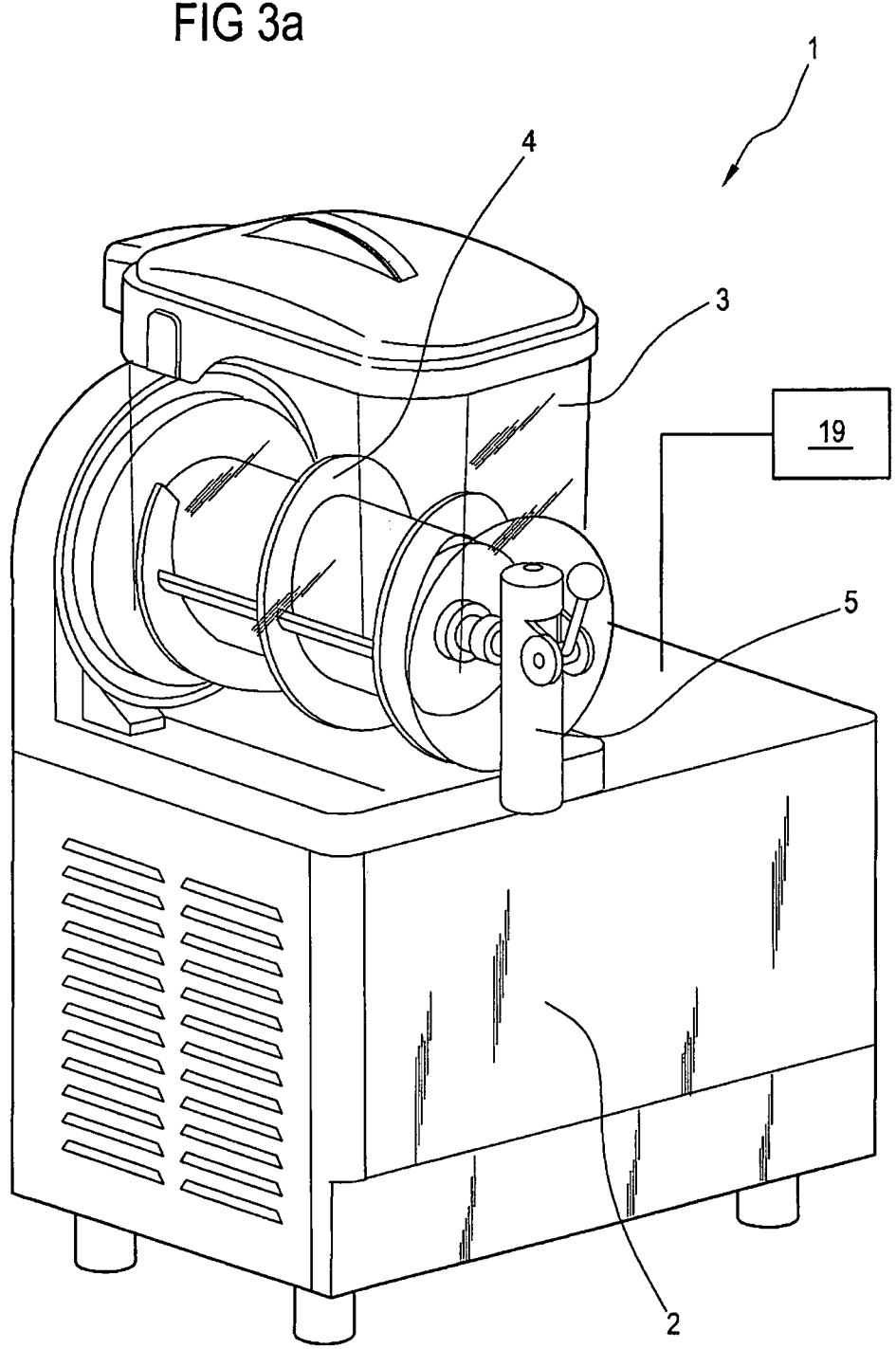
FIGS. 3*a* and 3*b* are schematic perspective views of examples of machines made in accordance with the present invention.
Figure 3B:
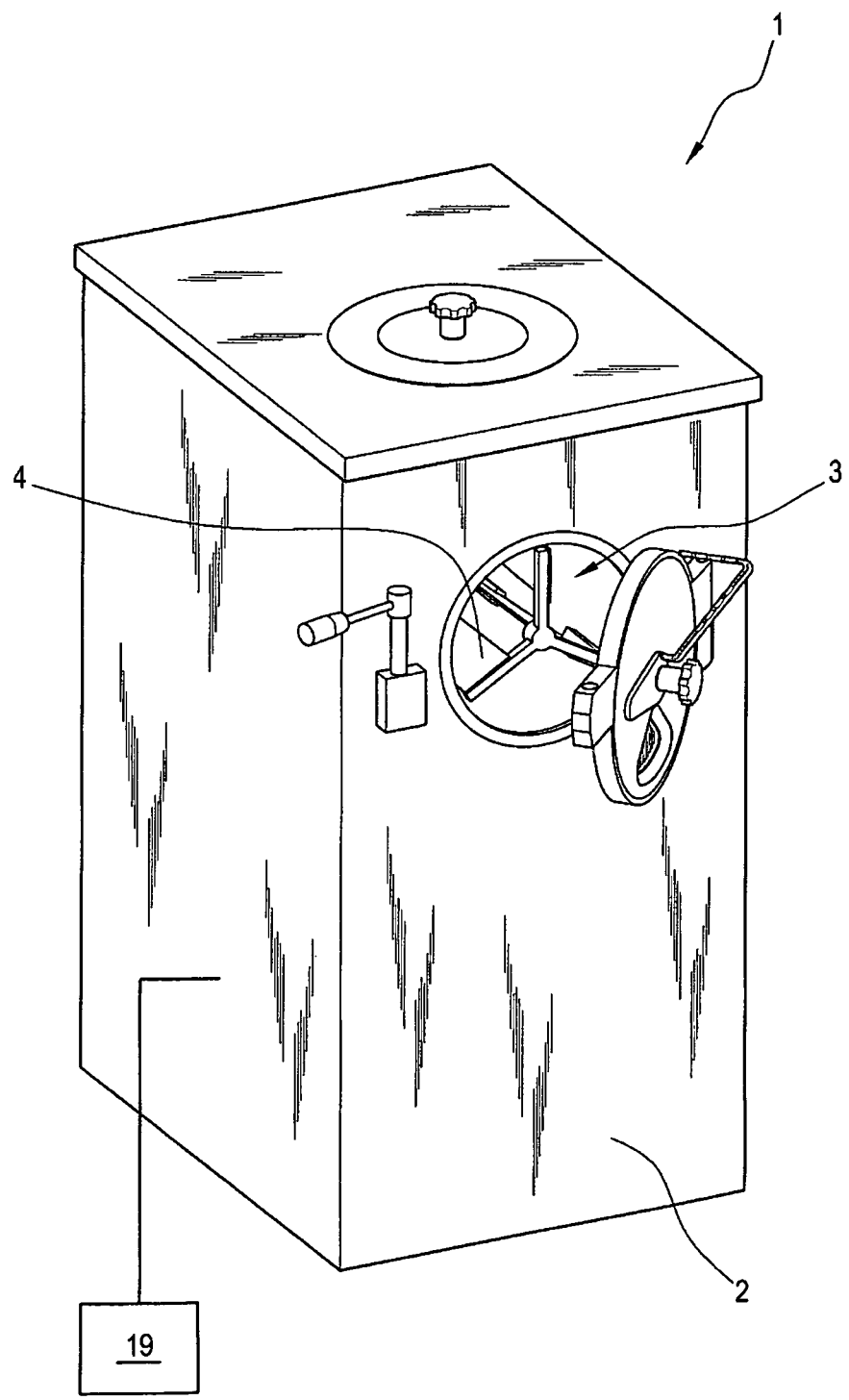

With reference to FIG. 1, the numeral 1 denotes as a whole a machine for the treatment of liquid and semi-liquid food mixtures. The machine 1 may be, for example, a whipping and freezing/heating unit and/or a pasteurizing machine, a crushed-ice drink maker or the like. FIG. 3*a* shows, by way of example only and without limiting the scope of the invention, a crushed-ice drink maker, whilst FIG. 3*b* shows a whipping and freezing/heating unit, also by way of example only. In both of the FIGS. 3*a* and 3*b* it can be seen how, on the outside, the machine described below has a base 2 substantially having the shape of a parallelepiped, supporting at the top a whipping and freezing/heating container or tank 3 for one or more basic products. Inside the tank 3, also called a whipping and freezing/heating unit, there is a mixer 4, also called a blender or scraper, comprising a blade or screw shaped element rotating about a fixed axis, which mixes the basic products introduced into the tank 3.

If necessary, outside the tank 3 the machine may have end product dispensing means 5.

Figure 2:
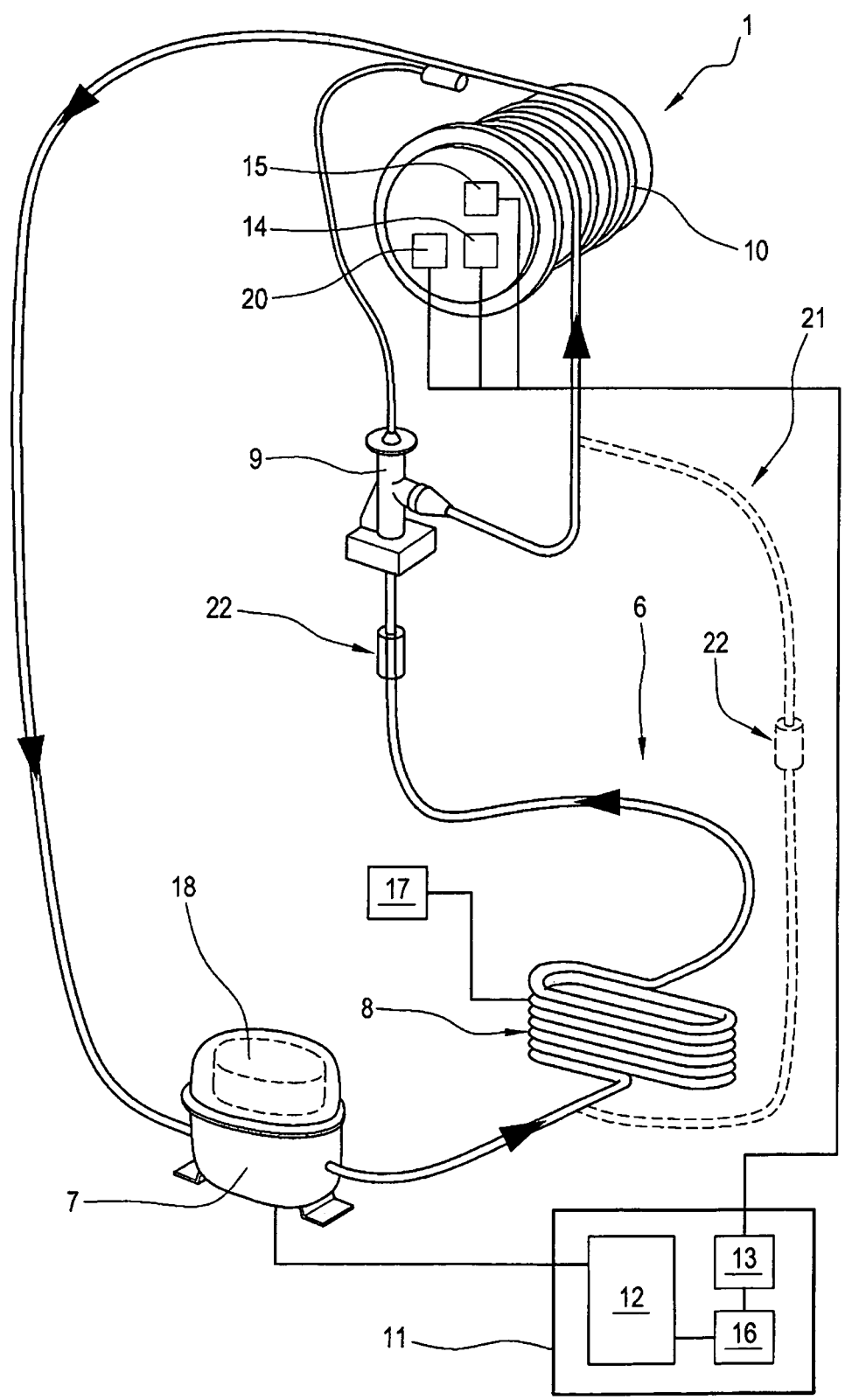

As shown in FIGS. 1 and 2, the machine 1 also comprises a product cooling and/or heating circuit 6. When suitably mixed and cooled/heated for a predetermined period of time, the product is transformed into the desired end product.

Advantageously, the cooling and/or heating circuit 6 is a conventional refrigerating cycle, therefore able to cool the whipping and freezing/heating tank and the product being processed, as illustrated in FIG. 2.

The refrigerating system of the machines disclosed may also be used with the "hot gas" method, as illustrated again in FIG. 2 by the path indicated by the dashed line portion, showing a hot gas by-pass 21, explained in more detail below.

Alternatively, the refrigerating system of the machines disclosed may also be used with cycle reversal, that is to say, operating as a heat pump, so as to heat, as shown in FIG. 1.

The cooling and/or heating circuit 6 comprises a compressor 7 driven by an electric motor 18, housed in the same casing as the compressor 7, a condenser 8, an expansion valve 9 and an evaporator 10.

The electric motor 18 may be an asynchronous motor or alternatively a brushless motor.

The expansion valve 9 may be a thermal expansion valve, as illustrated in the accompanying drawings in FIGS. 1 and 2, or alternatively an electronic valve.

FIG. 1 shows the diagram relating to a circuit 6 for heating like a conventional heat pump, in which the condenser 8, which yields heat, is connected to the whipping and freezing/heating tank 3.

In contrast, FIG. 2 shows a refrigerating circuit 6 for cooling, in which the evaporator 10 is connected to the whipping and freezing/heating tank.

FIG. 2 also shows how downstream of the compressor there may be a portion of system, shown with dashed lines, representing the hot gas by-pass 21. In other words, when a machine can be made to operate both hot and cold, this by-pass 21 is prepared, which converts machine operation from cold to hot.

The system line, passing through the condenser 8 and the expansion valve 9, is isolated by on-off solenoid valves 22 which, simultaneously, activate the by-pass 21.

This prevents the coolant fluid, compressed and heated, from being cooled in the condenser 8, so that it can arrive at the evaporator 10 still hot in order to heat its contents. The machine 1 also comprises a control unit 11 for the speed of rotation of the compressor 7 electric motor 18, designed to regulate the compressor operating speed and to vary the thermal power supplied by the compressor 7 according to the quantity of mixture treated in the whipping and freezing/heating unit 3.

Advantageously, the control unit 11 comprises an actuator device 12, which transmits to the electric motor 18 a corresponding variable power actuator signal, to regulate motor 18 operation.

The control device 12 comprises an inverter or a driver.

Advantageously, there is also a feedback control of the absolute position of the electric motor 18 rotor: the signal relating to this information is sent by the motor 18 to the control device 12.

The control unit 11 also comprises an electronic board 13 with a microprocessor, for receiving the electric signals indicating the quantity of mixture present in the tank 3, its temperature and consistency (i.e.: mixer 4 motor current draw) according to the whipping and freezing/heating time.

If necessary, the machine may have a communication interface 19 allowing an operator to make suitable selections or enter correct settings, for example relating to the type of basic products inserted and therefore information about the quality and composition of the mixture being processed (whether or not it contains fruit, creams, chocolate, etc.). Based on said values, the electronic board 13, using a program installed in the microprocessor, can select the most suitable type of power to send from the actuator device 12 to the electric motor 18 acting on the compressor 7.

The signals relating to the quantity of mixture and the temperature arrive from a plurality of level and temperature sensors 14 present in the tank 3. In addition to said sensors, inside the whipping and freezing/heating unit 3 there may also be a dosing device 15 designed to measure the quantity of basic products introduced into the tank 3.

The machine 1 may comprise an optional module 20, designed to identify the type of product being processed in the whipping and freezing/heating tank 3, for example through analysis of the temperature profile of the product subjected to whipping and freezing/heating. In other words, as time passes different products absorb different amounts of heat, thus defining a temperature profile for the mixture being processed. The temperatures at whipping and freezing/heating unit infeed and outfeed can be used to identify the composition of the mixture. The information obtained by the module 20 can be used as an alternative to the information acquired from the machine using the user interface 19.

It should be noticed that the module 20 may be either a hardware module suitably prepared to carry out the functions described above, or a software module loaded in the microprocessor of the electronic board 13 and able to implement a similar algorithm.

Along the refrigerating circuit there are other temperature and pressure sensors, of the known type and therefore not illustrated, designed to constantly monitor the temperature and pressure values of the entire system.

Both the information relating to the type of products being processed, and the system temperature and pressure values detected are sent to the electronic board 13.

The control unit 11 also comprises an adapter 16, designed to convert the digital electric signals arriving from the electronic board 13 into analogue signals to be sent to the electric motor 18 acting on the compressor 7.

At circuit level, the signal adapter 16 is therefore interposed between the electronic board 13 and the actuator device 12.

The signal adapter 16 may be physically separated from the electronic board 13 or integrated on it.

Figure 4:
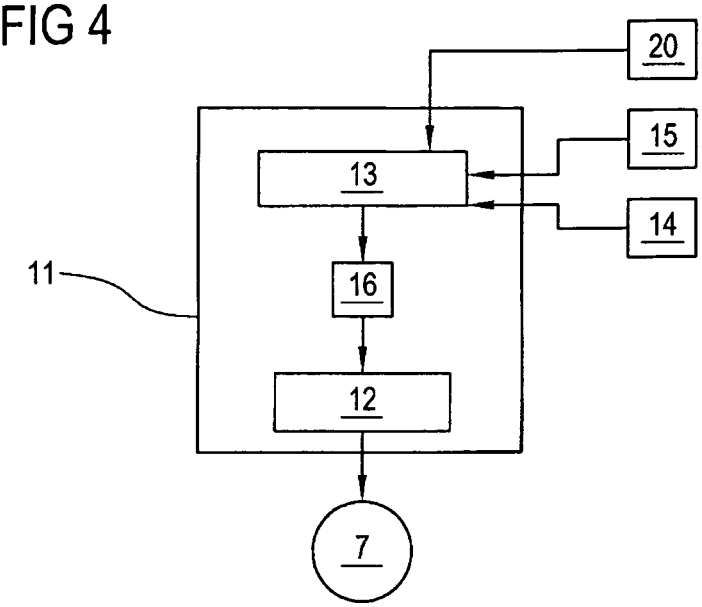
FIGS. 4 and 5 are block diagrams of two embodiments, in accordance with the present invention, of a control unit included in the machine for the treatment of liquid and semi-liquid food mixtures in accordance with the present invention.
Figure 5:
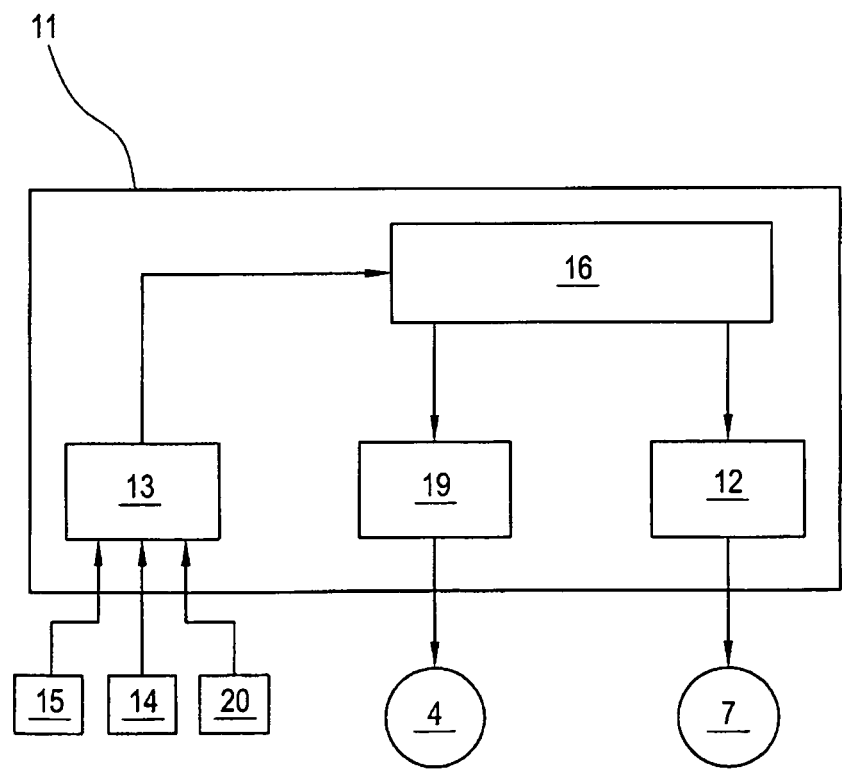

FIGS. 4 and 5 are two block diagrams of the control unit. They show the various elements of which the control unit 11 consists as separate from each other to better illustrate their functional connections rather than their structural ones.

Advantageously, the signal adapter 16 receives as input from the electronic board 13 microprocessor a modulated square wave and supplies an analogue output designed to control the actuator device 12.

Said analogue output or actuator signal may be a voltage signal or a variable frequency signal. By way of example only, an adapter of the type described may be a DAC converter.

In practice, during a normal machine 1 production cycle, after introducing all of the basic products of which the mixture consists into the tank 3, the mixer 4 and the cooling and/or heating circuit 6 are activated.

The level and temperatures sensors 14, the dosing device 15, able to measure the quantity of product introduced into the tank 3, and the device 19, designed to identify the composition of the mixture, send the information relating to the quantity and quality of the mixture present in the tank 3 and relating to the temperature reached by the mixture to the electronic board 13, which gathers said information so as to define, with the aid of the microprocessor, the type of power to be supplied to the compressor 7 electric motor 18.

Said information, suitably converted by the signal adapter 16, is sent to the actuator device 12, which starts the compressor 7 motor according to the specific indications.

Alternatively to the analogue signal, the information arriving from the electronic board 13 may be supplied to the actuator device 12 by means of switches, for example suitably controlled relays or TRIACs. Another alternative to communication between the electronic board 13 and the actuator device 12 is serial communications, for example RS 232 or RS 485 if necessary using a fieldbus (for example can, canopen, modbus, etc.).

For example, since the thermal power supplied by the compressor is, the product mixing time being equal, approximately proportional to both the quantity of mixture treated and the speed of rotation of the electric motor 18, and since the latter is approximately proportional to the frequency of the electric current, then variable frequency operation allows the machine to always operate in the optimum way, irrespective of the quantity of product treated. In other words, the machine 1 can operate with values of electrical power absorbed by the compressor 7 that are proportional to the quantity of product treated.

In an alternative configuration, schematically illustrated in FIG. 5, the control unit 11 also acts on the electric motor, not illustrated, which controls the mixer 4. In this case the control unit 11 comprises a second actuator device 19, similar to the first already described, designed to regulate the speed of rotation of the electric motor which controls the mixer 4.

Operation of the machine 1 with the actuator device acting at least on the compressor electric motor 18 can be further improved and controlled by using as an expansion element an electronically controlled thermal expansion valve 9 for coolant gas overheating at the evaporator 10 outfeed. This type of valve 9 allows a reduction in the oscillations caused by overheating, improving compressor 7 intake, since it tends to stabilize the density of the gas sucked in, avoiding, in particular during transient operation typical of machines for producing ice cream, compressor 7 intake and delivery temperatures that are too high.

This, as well as rendering compressor 7 refrigerating output regular, improves its lubrication and life.

Control of the machine 1 described is completed, for the production of quantities of mixture different to that considered optimum in conventional machines, if in addition to the evaporator 10 and the compressor 7 there is also control of the condenser 6 using a coolant fluid flow rate control device 17. In particular, it is important to ensure that the flow rate of the coolant fluid, air or water, is as low as possible, but without the pressure falling too low so that both throttle elements, such as conventional thermal expansion valves, can operate with the necessary precision, and the condenser exchange surface is not too big, thus containing costs.

Control of the condenser, and therefore of the coolant fluid flow rate, is achieved using a flow rate regulating valve, so as to maintain the condensation pressure constant or slightly lower than the nominal design value, or using a set of small impellers which can be switched off in sequence and which act on the condenser.

The advantage obtained with the machine disclosed, compared with conventional machines, is that operation of the cooling and/or heating circuit remains unchanged irrespective of the quantity of product to be treated. Consequently, the condensation and evaporation pressures can be maintained approximately constant relative to the compressor delivery and intake values, in particular avoiding big drops in the intake pressure and simultaneous increases in the delivery pressure, with the risk of burning the lubricating oil.

Moreover, above all when a quantity of product is produced which is less than the maximum quantity accepted by the machine, the active parts of the machine, such as the compressor and the mixer, are less worn than in conventional machines.

In conclusion, the machine equipped with an activation device, such as an inverter or a driver, designed to control the compressor electric motor, allows further significant advantages to be obtained compared with conventional machines. Such advantages are further increased if, as well as controlling the speed of rotation of the compressor motor, the speed of rotation of the motor which controls the mixer is also regulated, with a second activation device dedicated to controlling only the mixer speed of rotation.

The advantages which can be obtained from a machine comprising a compressor operating speed control and from a machine comprising a compressor and mixer operating speed control, definitely include extension of the average life of the compressor and the mixer, since such components are subjected to less stress when smaller quantities of product have to be processed.

Able to process limited quantities of product, the machine disclosed is also very flexible and can be adapted to any production requirement, without giving up the optimum quality of the end product.

Indeed, this type of regulation of the speed of components absolutely does not affect product quality. Moreover, the machine described allows considerable savings in terms of electrical energy consumption, since it can modulate the frequency required to operate the electric motor or motors.

Whether controlling only the compressor speed or also regulating the mixer speed of rotation, use of the activation device for the electric motor to control the speed of operation of the individual components guarantees a considerable energy saving, improves the quality of the end product and reduces wear on mechanical components, with consequent savings in terms of maintenance and average life of the whole machine.

Moreover, mixer speed of rotation control allows control of the torque applied to the product being processed, used to determine the correct final consistency of the mixture whipped and frozen/heated.

Finally, such a machine can give optimum proportionality between the thermal power to be removed from or supplied to the whipping and freezing/heating tank and the quantity of end product obtained. In other words, with the control unit which regulates the electric motor speed of rotation, the machine is always able to operate in optimum conditions irrespective of the quantity of mixture to be treated. It is operation of the compressor which is adapted according to the quantity of product present in the whipping and freezing/heating tank. The same applies if the mixer speed of rotation is controlled.

In conclusion, the machine disclosed provides a device for making ice cream or creams in which an optimum quantity of product is obtained with a production cost very proportional to the quantity, thus eliminating energy wasting typical of conventional machines, which occurs above all when quantities of product must be made which are less than the maximum load for which the machines were sized.

The invention described above is susceptible of industrial application and may be modified and adapted in several ways without thereby departing from the scope of the inventive concept. Moreover, all details of the invention may be substituted by technically equivalent elements.

What is claimed is:
1. A machine for treating liquid and semi-liquid food mixtures, comprising:

at least one chosen from a container and tank for the mixture, at least one circuit for at least one chosen from cooling and heating basic products of the mixture, a mixer rotating inside the tank to mix the basic products contained in the tank;

the at least one circuit for at least one chosen from cooling and heating comprising a compressor driven by an electric motor;

a unit for controlling a speed of rotation of the compressor electric motor, for regulating compressor operation and varying a thermal power supplied by the compressor at least according to a quantity of mixture treated.

2. The machine according to claim 1, wherein the control unit comprises an actuator device which transmits variable power to the electric motor, for regulating motor operation.

3. The machine according to claim 2, wherein the actuator device comprises at least one chosen from an inverter and a driver.

4. The machine according to claim 3, wherein the electric motor is at least one chosen from asynchronous and brushless.

5. The machine according to claim 4, comprising a dosing device for measuring a quantity of basic products introduced into the tank.

6. The machine according to claim 5, comprising at least one chosen from a plurality of level sensors for detecting the quantity of mixture treated, a plurality of temperature sensors for detecting a temperature of the mixture treated, and a module for identifying a type of mixture treated present in the tank.

7. The machine according to claim 6, wherein the control unit comprises an electronic board with a microprocessor for detecting electric signals indicating at least one chosen from the quantity of the mixture, the temperature of the mixture, and the type of the mixture present in the tank, allowing selection of a correct power with which the actuator device supplies the compressor electric motor.

8. The machine according to claim 7, wherein the control unit comprises a signal adapter for adapting electric signals arriving from the electronic board into suitable signals to be sent to the actuator device.

9. The machine according to claim 8, wherein at circuit level, the signal adapter is interposed between the electronic board and the actuator device.

10. The machine according to claim 8, wherein the signal adapter is integrated on the electronic board to supply an analog output.

11. The machine according to claim 10, wherein the signal adapter receives as input from the electronic board a modulated square wave and supplies an analog output for controlling the actuator device.

12. The machine according to claim 11, wherein the analog output is at least one chosen from a voltage and a variable frequency output.

13. The machine according to claim 12, wherein the control unit controls the speed of rotation of the electric motor of the mixer, for regulating a mixer operating speed according to at least the quantity of mixture treated.

14. The machine according to claim 13, wherein the control unit comprises a second actuator device which transmits variable power to a second electric motor acting on the mixer, for regulating motor operation.

15. The machine according to claim 14, wherein the at least one circuit for at least one chosen from cooling and heating comprises a condenser.

16. The machine according to claim 15, comprising a device for controlling a flow rate of a coolant fluid contained in the condenser.

17. The machine according to claim 16, wherein the flow rate control device comprises a flow rate regulating valve, to maintain a condensation pressure at least one chosen from constant and lower than a preset nominal value.

18. The machine according to claim 16, wherein the flow rate control device comprises a plurality of small impellers which can be switched off in sequence acting on the condenser.

19. The machine according to claim 18, wherein the at least one circuit for at least one chosen from cooling and heating circuit comprises an evaporator.

20. The machine according to claim 19, wherein the at least one circuit for at least one chosen from cooling and heating comprises an electronically controlled thermal expansion valve for monitoring a temperature of the coolant fluid at an evaporator outfeed.

* * * * *